UNITED STATES PATENT OFFICE.

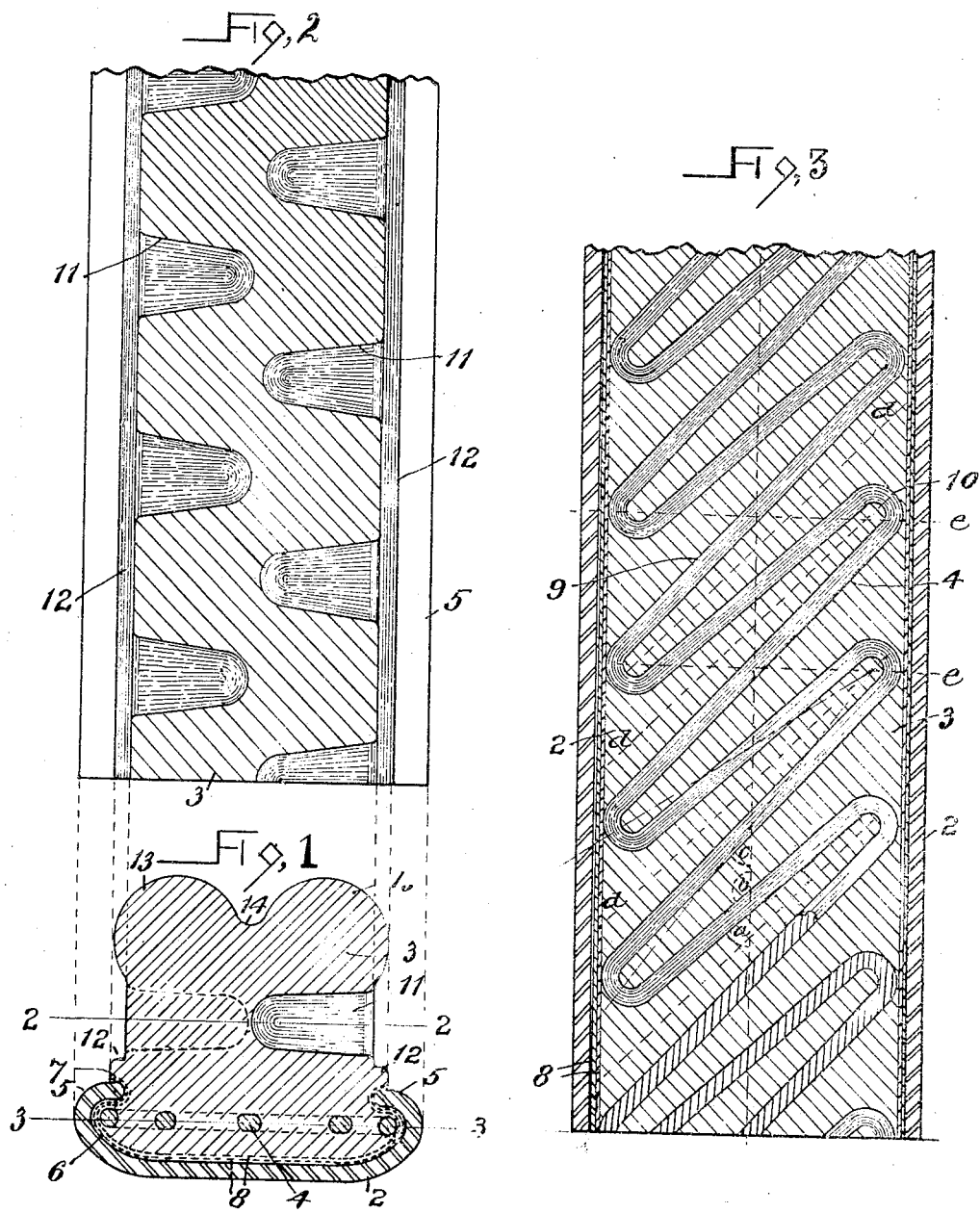

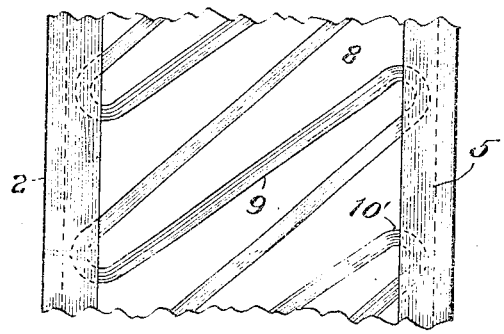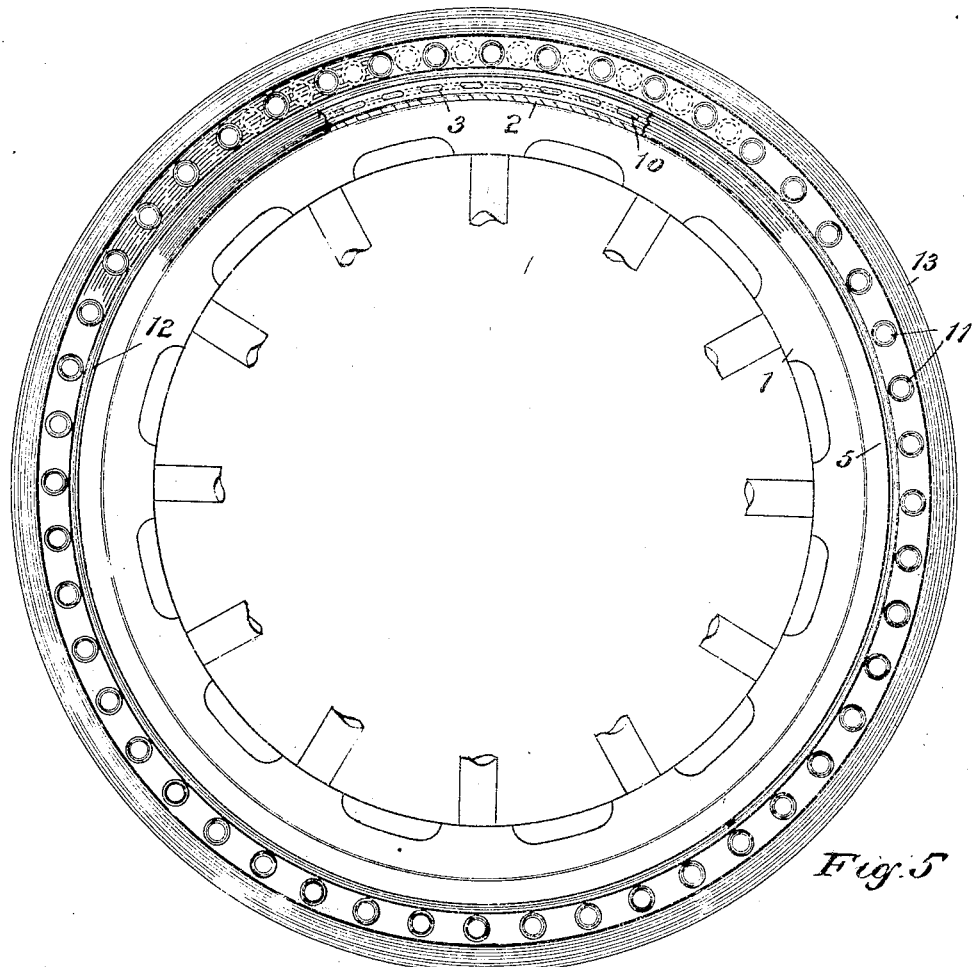

FRANKLIN W. KREMER, OF RUTHERFORD, NEW JERSEY.

TIRE.

1,328,632.  Specification of Letters Patent.  Patented Jan. 20, 1920.

Application filed August 6, 1915, Serial No. 43,973. Renewed November 17, 1919. Serial No. 338,528.

*To all whom it may concern:*

Be it known that I, FRANKLIN W. KREMER, a citizen of the United States, and a resident of Rutherford, in the county of Bergen and State of New Jersey, have invented certain new and useful Improvements in Tires, of which the following is a specification.

The object of my invention is to provide for securing in the most advantageous manner the tire of a vehicle to the wheel upon which the tire is mounted.

Great difficulty has heretofore been experienced with motor vehicles, especially commercial trucks, in the matter of enabling tires to be held fast upon the wheel rims, against displacing and dislocating tendencies due to stresses to which the tires are subjected in practice. To meet this condition, the builders of such vehicles have often been compelled to make the fastening devices large and strong, and to increase to a corresponding extent the dimensions of the parts of the tire engaged by such devices, as well as of the tire as a whole. Such an expedient not only makes a very cumbersome construction, but increases the expense of the tire, while at the same time reducing its resiliency; for, aside from the question of the cost of the materials used in producing the tire, there is a limit in size, especially with tires made of rubber, beyond which most of the cushioning effect is lost.

My invention seeks to lessen and eliminate all of the above mentioned drawbacks by the employment of fastening means which not only acts to hold the tire securely in its seat on the wheel-rim under all practical conditions, but is also so designed as to be actually capable of utilizing the stresses which are exerted on the tire of a moving vehicle, to increase and tighten the engagement between the tire and its seat on the wheel when the tire is under load; and further, I succeed in obtaining such a result without losing any of the cushioning effect of the material of which the tire is made; or increasing the size or consequent expense thereof. Hence, it is absolutely impossible, by any force short of that needed to tear the tire apart, to dislocate the tire or separate it from the rim of the wheel; and, as I shall hereinafter point out, my invention, as embodied in finished form, can, further, be easily put in a tire with very little trouble or labor in such wise as to be in constant readiness for service, and at the same time be so simple in its structure and comprising so few parts as to be readily, easily and cheaply manufactured.

The above and other objects and advantages of my invention will be more fully set forth in the following description, and be exactly defined in the appended claims. It is to be understood, however, that I may make changes in the shape, size and arrangement of the various parts and otherwise vary the construction actually illustrated, to the full extent of the meaning of the terms in which the claims are expressed. On the drawings:

Figure 1 is a cross section of my improved tire and the means for securing the same to the wheel.

Fig. 2 is a section of a circumferential portion taken on the line 2—2 in Fig. 1.

Fig. 3 is a similar section taken on the line 3—3 of Fig. 1.

Fig. 4 is a view of a detail showing the manner in which the tire is caused to engage its seat on the wheel so that it cannot be dislocated; and, Fig. 5 is a side view partly in section showing the wheel upon which my invention is mounted.

The same numerals of reference are used to indicate the same parts on all the views.

I show at 1 in Fig. 5 a wheel upon which my tire may be mounted and this will have fastened to its felly a clencher-rim 2 of the well known type. This clencher-rim 2 provides a seat which receives the tire 3, and the numeral 4 indicates the fastening member, in the form of a flat spring, which has its ends joined together to give it the form of a ring like the tire itself. This spring is made of an elongated resilient metal body bent, from one side to the other a great number of times to provide a sort of zig-zag formation, as clearly illustrated in Figs. 3 and 4. As I shall presently discuss at length, the portions of the spring which are bent back and forth as just stated approach parallelism with one another; extending both transversely and diagonally with respect to the longitudinal or circumferential axis of the spring; and the effect of this will be to cause the width of the spring, measured straight across the same, to decrease under compression and increase when tension is applied. In other words, if a piece of metal bent into the form of a spring as shown in Figs. 3 and 4, be spread out flat and the ends pulled in opposite directions the general width of this spring, measured across the rounded ends of the zig-zag portions, will increase; and if compression be exerted to force the extremities of the spring toward each other the width will diminish. A fastening member having the form of such a spring will be embedded in the tire 3 adjacent the inner face of the same and it will be apparent, as will be hereinafter particularly set forth, how such a spring will cause a tire to be held in the clencher-rim 2 of the wheel when the vehicle fitted with such tires is in motion along a roadway.

The clencher-rim 2 is provided with engaging members, such as the usual inturned flanges 5 along its sides and the tire 3 will have annular beads 6 along its inner edges to fit under the flanges 5. Above these beads the sides of the tire is provided with grooves 7 in which the inner edges of the flanges 5 are received; and all of the portions of the tire 3 which come in contact with the surface of the clencher-rim 2 will be strengthened by means of one or more layers of suitable fabric 8. The fastening member 4 is embedded in the tire 3 between the beads 6; so that the rounded ends thereof will be in position to project outward under the flanges 5, as shown particularly in Fig. 4, in order to have the desired function and result.

The portions of the spring which are bent back and forth; in other words, the zig-zag sections, are indicated by the numeral 9, and the portions which connect the adjacent sections 9, making rounded corners at each side of the spring, are indicated by the numeral 10. Owing to these rounded portions, any likelihood of the ends of the sections 9 wearing out the fabric 8 by rubbing holes through the same, as would occur in case the sections 9 had abrupt ends with corners, is eliminated.

By reference to Fig. 3 it will be seen that the sections 9 all extend across the median line of the spring diagonally and approach parallelism with one another. If the sections be conceived as, beginning all at one side of the medial line and ending on the opposite side, it will be apparent that the sections are not only all diagonal with respect to the median line of the spring, but also extend diagonally in the same direction. That is to say, taking the sections as beginning at the left and ending at the right, all of the sections will extend diagonally upward; and if they are conceived as beginning at the right and ending at the left of this median line they all extend diagonally downward. As a result the alternate angles at which the sections 9 intersect the median line, considering the angles on the same side will all be acute or all obtuse. For example, the angle indicated by the letter *a* will be acute; the next angle, indicated by the letter *b*, on the same side of the median line, but on the opposite side of the same section will be obtuse; and the next angle *c* made by the next section will be acute like the angle *a*. Furthermore, if lines are drawn from the centers of curvature of the rounded corners 10 in such a way as to bisect the angles between the alternate sections these lines, indicated by the letter *d* on Fig. 3, will not only be diagonal with respect to the median line of the spring, but will be substantially parallel to each other.

Another geometric property due to the peculiar shape of the spring 4 will be perceived by considering certain perpendiculars to the median line of the spring indicated by the letter *e*. It will be clear by choosing certain points along the median line, the perpendiculars to this line at such points may intersect a plurality of zig-zag sections 9. On Fig. 3, one of such perpendiculars, namely the upper one, is illustrated as intersecting no fewer than three of said sections, while another perpendicular below the one just mentioned is shown as intersecting two sections. With an ordinary zig zag spring a perpendicular to the median line at any one point could not be made to intersect more than one section, that is, there would be only one point at which the perpendicular would actually cut through the material of which the spring is made, and no more.

The utility of my fastening member having the form of a zig-zag flat spring 4 with its sections 9 approaching parallelism will now be appreciated. The width of the spring will normally be greater than the distance between the inner edges of the flanges 5; whereby, as shown in Fig. 4, the rounded portions 10 at the ends of the zig-zag sections 9 engage under the flanges 5, and hold the beads 6 beneath the flanges. As each successive portion of the tire on the wheel 1 comes in contact with the surface over which the wheel is moving, that portion of the tire is stretched. Consequently the spring in that portion of the tire is elongated and therefore widened; causing the ends 10 to take hold more firmly under the flanges 5 and resist any displacing tendency that might dislocate the tire from its seat in the rim 2. In this way the very forces by which derangement or displacement might be effected are turned to account in eliminating the possibility of such derangement or displacement, and may be made to serve the useful purpose of holding the tire and the rim more securely together.

It will be understood, of course, that the width of the spring is somewhat less than the inside width of the clencher rim 2 measured between points under the flanges 5; that is, the width of the spring will be great enough to enable the rounded portions 10 to extend under the inturned flanges 5 without being in contact with the surface of the rim underneath these flanges. In this way sufficient space between the rounded portions 10 and the inside surfaces of the rim adjacent the flanges will be provided to enable the width of the spring to increase to the required extent when longitudinal tension is applied to any part of the spring, as above described.

In the sides of the tire 3 I provide a number of pockets 11; these pockets extending approximately half way through the tire and the pockets on one side being staggered with respect to those on the opposite side. Between the grooves 7 and these pockets I form annular shoulders or beads 12 on both sides of the tire; and on the outer face of the tire I provide a pair of treads 13 separated by a central circumferential groove 14. From Fig. 2 it will therefore appear that the pockets 11 have the effect of making the layers, so to speak, of the tire in which they are placed, serpentine in effect; and the result is that the pockets 11 will enable the treads 13 to yield to an extent sufficient to give the necessary degree of resiliency to the tire, without causing the tire to lose the rigidity and firmness which it requires to carry its load steadily and smoothly and without any likelihood of producing vibrations of the vehicle body; that is, the lateral motion or side sway so often met with in this type of tires.

When the tire 3 is made up upon a suitable circular form the fabric 8 is, of course, placed upon the form first and then rubber or the like is laid upon the fabric to make a layer of sufficient thickness to receive the member 4. This member is made flat and then it is bent into the form of a ring and its ends joined together; such a length being chosen as to require some initial stretching before it can be applied to the rubber or the like upon the fabric 8. The circular ring-shaped spring 4 need only be stretched slightly, hardly more than an inch and a half or so; but this degree of initial tension will be enough to insure the tire 3 fitting tightly against the outer face of the rim 2 when the tire is put on the wheel. The remainder of the tire is then built on the circular form over the spring 4, which is completely embedded therein; and when the tire is completed the spring is entirely hidden from view.

The clencher-rim is, of course, made in one piece and the complete tire can be applied to the rim by first working the bead 6 on one side in under one of the flanges 5. The bead on the opposite side is then gripped by means of a suitable tool and the tire compressed crosswise so to enable the other bead to be snapped under the other flange. Inasmuch as the force of this tool is exerted in a direction that is more or less lateral with respect to the sections 9, the portions of the spring give to the required extent to enable the opposite side of the tire to be pressed under the other flange 5; and as soon as the compression is removed the portions 9 of the spring restore themselves to their original positions. It will be seen from the shape of the spring as illustrated in the drawings, that when lateral pressure is exerted on the tire so as to compress the same and enable it to be forced under the flanges 5, the spring is made temporarily narrower and this condition is produced by causing the zig zag portions 9 to bend toward the median line of the spring; while so bending the sections 9 are flexed for the most part near the corners 10 and very little or not at all intermediate the rounded portions 10.

It will be clear that after the tire is fitted into the rim it cannot be pulled off by either a force which is exerted radially of the wheel or a force exerted along its circumference; that is to say in a direction along which the stress usually takes place when the wheel is running. In the first case the rounded portions 10 of the spring 4 engage against the under faces of the flanges 5; and in the second case the spring would be caused to widen out in the manner above stated and hold the tire all the more firmly against the inner surfaces of the flanges 5.

The tire will therefore be held firmly on the rim at all times and creeping and all tendencies to become deranged or displaced will be effectually counteracted, and it will be clear that these results can be obtained without sacrificing any of the advantages in the way of resiliency of the tire itself. My improvement will thus be seen to consist of very few parts and be exceedingly simple in its construction and application and therefore not at all expensive in production. In addition to the advantages above enumerated in connection with the spring 4, it will be apparent that this spring will act as a reinforcement to give that degree of transverse rigidity to the base of the tire which is indispensable in tires of this sort.

It will be understood, of course, that my invention can be employed with various types of tires and might even be utilized with pneumatic as well as solid tires. It can also be applied to almost any other kind of vehicle and is not by any means restricted to motor vehicles.

The sections 9 while they approach parallelism are not quite parallel, but all extend diagonally across the axis of the spring when the same is laid out flat before having its ends joined together. Preferably the spring will be distended so that lines drawn from the center of the curvature of two of the rounded portions 10 on one side to the center of curvature of the intermediate portion 10 on the other side will make an angle of about 30 degrees with each other, as illustrated in Fig. 3.

Of course, it is not essential that the flanges 5 be made integral with the rim 2. My invention will work just as well with tires having beads 6 or parts corresponding thereto engaged by bands or rings made separate from the rim.

Having described my invention, what I claim to be new, and desire to secure and protect by Letters Patent of the United States is:

1. A tire having associated therewith a spring comprising zig zag sections, said sections making angles with one another such that the bisectors of said angles all extend across the median line of the spring in a diagonal direction.

2. A tire having associated therewith a spring comprising zig zag sections, said sections making angles with one another such that the bisectors of said angles all extend diagonally across the median line of said spring in substantially parallel directions.

3. A tire having associated therewith a spring comprising zig zag sections, said sections intersecting the median line of the spring in such directions that the alternate angles made by said sections on one side of the median line are either acute or obtuse.

4. A tire having associated therewith a spring comprising zig zag sections, said sections extending across the median line of said tire in such directions that the perpendiculars to said line may intersect a plurality of said sections.

Signed at New York, in the county of New York and State of New York, this 29th day of July, A. D., 1915.

FRANKLIN W. KREMER.